United States Patent [19]
Erman et al.

[11] Patent Number: 4,925,264
[45] Date of Patent: May 15, 1990

[54] OPTICAL SWITCHING ELEMENT COMPRISING TWO PARALLEL OPTICAL GUIDES AND SWITCHING MATRIX CONSTITUTED BY SUCH ELEMENTS

[75] Inventors: Marko Erman, Paris; Rémi Gamonal, Brunoy, both of France

[73] Assignee: U.S. Philips Corp., New York, N.Y.

[21] Appl. No.: 251,635

[22] Filed: Sep. 29, 1988

[30] Foreign Application Priority Data

Oct. 2, 1987 [FR] France ............................. 87 13645

[51] Int. Cl.$^5$ .............................................. G02B 6/10
[52] U.S. Cl. .............................. 350/96.13; 350/96.14
[58] Field of Search ........................... 350/96.14, 96.13

[56] References Cited

FOREIGN PATENT DOCUMENTS 0209190 1/1987 European Pat. Off. .

OTHER PUBLICATIONS

"Double Heterostructure GaAs-AlxGa1-x as Rib Wave Guide Directional Coupler Switch", Second European Conference on Integrated Optics, 17-18, Oct. 1983 in Florence, Italy.
"New Directional Coupler for Integrated Optics", Journal of Applied Physics, vol. 45, No. 11, Nov. 1974, pp. 4997 to 4999.

Primary Examiner—William L. Sikes
Assistant Examiner—Robert E. Wise
Attorney, Agent, or Firm—William L. Botjer

[57] ABSTRACT

An optical switching element including two optical guides constituted by linear parallel strips coupled through a distance d and made of semiconductor material having an index $n_1$ on a semiconductor substrate having an index $n_o < n_1$ and provided with electrodes $E_{ii}$ to carry out the switching of the light from one guide to the other, characterized in that the first guide $G_{ii}$ is connected on the one hand to an input $IN_i$ and on the other hand to a direct output $I'_i$ of the switching element, and in that the second guide $H_{ii}$ is provided beyond the zone of the electrodes $E_{ii}$ with a flat mirror $M_{ii}$ at 45° with respect to its optical axis, which reflects the light into a guide $H'_{ii}$ perpendicular to $H_{ii}$, in that $H'_{ii}$ is coupled through a distance d to a guide $G'_{ii}$, the guides $H'_{ii}$ and $G'_{ii}$ being provided with electrodes $E'_{ii}$ to direct the light towards the output $O_i$ of the guide $G'_{ii}$, and in that the systems of the guides $G_{ii}$, $H_{ii}$, $H'_{ii}$, $G'_{ii}$ are covered by a planar confinement layer of a semiconductor material except the region $Q_{ii}$ of the mirror $M_{ii}$. Application: switching matrix for telecommunication purposes.

18 Claims, 10 Drawing Sheets

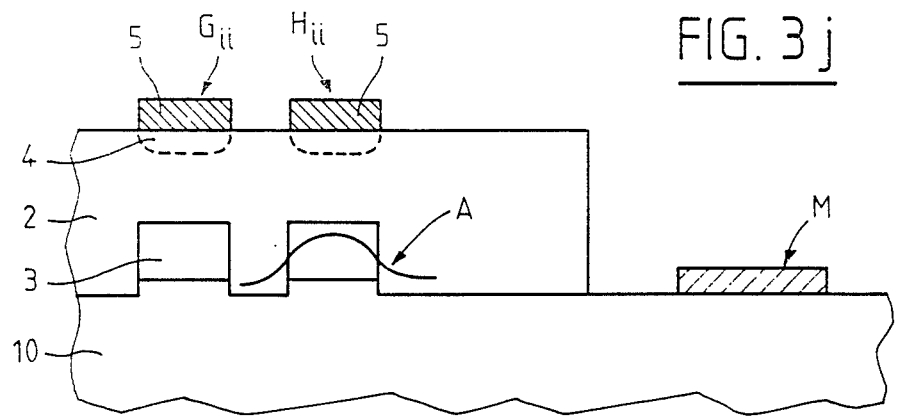
FIG. 3j
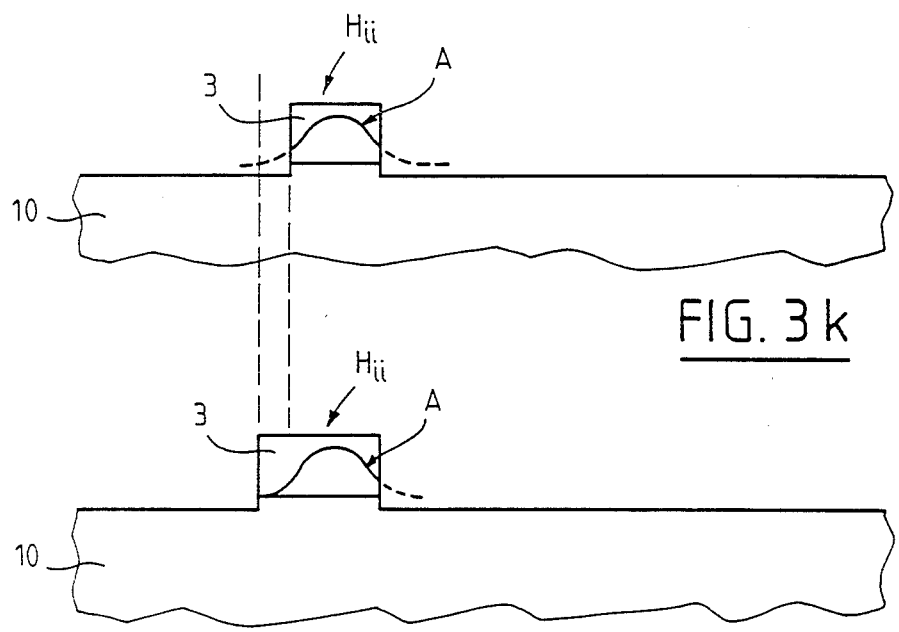
FIG. 3k
FIG. 3l

OPTICAL SWITCHING ELEMENT COMPRISING TWO PARALLEL OPTICAL GUIDES AND SWITCHING MATRIX CONSTITUTED BY SUCH ELEMENTS

BACKGROUND OF THE INVENTION

The invention relates to an optical switching element comprising two optical guides, whose opposite walls are separated by a small distance d designated as coupling distance and are parallel over a length D designated as coupling length, these optical guides being each constituted by a linear strip $G_{ii}$ and $H_{ii}$, respectively, of a semiconductor material having a first refractive index $n_1$ formed on a semiconductor substrate of a material having a second smaller refractive index $n_o$, the dimensions of these guides being such that they each transport a monomode wave and the operation of switching the light from one guide to the other guide being set up by the effect of potentials or currents to which electrode systems $E_{ii}$ and M applying to the guides are brought.

The invention further relates to an optical switching matrix formed by a number n×m of these switching elements.

The invention finally relates to a method of manufacturing the switching element and the matrix.

The invention is used in the switching of optical signals transported by optical fibres, for example in the field of telecommunication, in which the switching between numerous optical fibres must be rendered possible to avoid that the optical signals transported by the fibres must be converted into electrical signals during the operation of switching between the different subscribers.

An optical element apt to form a switching matrix of the kind defined in the opening paragraph is known from the publication entitled: "Double heterostructure GaAs—$Al_xGa_{1-x}$As Rib Wave Guide Directional Coupler Switch" by J. Brandon, A. Carenco et alii in "Second European Conference on Integrated Optics", 17–18, Oct. 1983 in Florence, Italy.

This document describes a switching element constituted by two optical guides each formed by a strip of gallium arsenide (GaAs). These strips are parallel and are formed beside each other at the surface of a layer of gallium aluminium arsenide (GaAlAs), which serves as a layer confining the light in the guides opposite to the flat substrate of gallium arsenide (GaAs). Another layer of gallium aluminium arsenide (GaAlAs) covers each of the strips forming the guides. The latter are formed on the other hand in relief on the substrate by etching a starting layer. Electrodes of the Schottky type are finally formed at the surface of each of the guides, while the opposite surface of the substrate is provided with a layer forming an ohmic contact.

The guides each transport a monomode wave and due to the small distance separating them laterally a polarization applied to one or the other of the guides permits of changing the coupling of the two monomode guides, thus ensuring the desired switching.

However, the coupling length, that is to say the length necessary in order that the light passes from one guide into the other, depends on the one hand upon the coupling distance, that is to say the distance laterally separating the guides, and on the other hand upon the structure of the guides. The structure of the guides known from the aforementioned document is of the "external strip" type. Now the coupling between two such guides is small and therefore the coupling length is great, i.e. typically 5 to 8 mm.

Such distances are much to great to be used for the formation of integrated switching matrices. In fact, a matrix will comprise a number n of such coupling elements arranged in cascade in the longitudinal direction of the guides, which will lead to surfaces redhibitory for the integration.

On the other hand, in order to obtain such a switching matrix, it is necessary to deflect periodically the optical path of one of the waves; this can be obtained by joining one of the guides of one element to one of the guides of another element by means of a curved guide portion, as is shown in the publication entitled: "New Directional Coupler for Integrated Optics" by F. Auracher and H. H. Witte in "Journal of Applied Physics", Vol. 45, No. 11, November 1974, pp. 4997 to 4999. However, in order to present small losses, the curved guide must have a large radius of curvature, i.e. typically ten milimeters, in order to keep the losses below 1 dB, during a change in direction of 90°. The surface area occupied by the matrix is the more substantial and less suitable for integrations.

The latter document proposes to obviate certain disadvantages of such a switching element in that the guides are obtained by means of superimposed layers. However, during use it appears that the masks necessary for the alignment of one guide with respect to the other must be formed with such a high accuracy that the manufacturing efficiency becomes too low for an economical application for integrated circuits. This document thus proposes a structure in which two optical guides are arranged beside each other separated by a distance sufficiently great to avoid a spontaneous coupling and are covered by a layer to obtain a third optical guide straddling the two first guides and separated by a dielectric layer from said guides. This document indicates that in these conditions the coupling is improved. However, in addition to the disadvantage due to the aforementioned alignment of the superimposed guides, the problem is still complicated due to the fact that this structure requires the use of three optical guides. Moreover, no other devices are shown than a discrete element and there is not indicated either how a complete switching matrix should be obtained. Now the designer of circuits knows how difficult it is to pass from the formation of a discrete element to the formation of a complex circuit.

Finally, it is known from European Patent Application EP-A-0 209190 to apply a mirror to one of the guides to deflect the light beam. However, the structure described is constituted by two superimposed guides, which structure has to be avoided for the reasons described above, while on the other hand the formation of a mirror on the upper guide by means of etching comprises very critical masking steps in order to avoid the etching of the lower guide, which renders the formation of this assembly comparatively difficult. Consequently, the efficiency of manufacturing such a device would be low.

SUMMARY OF THE INVENTION

Now in the envisaged field of application to telecommunication, there is a demand for electrooptical circuits of increasingly higher performance, increasingly stronger miniaturized and increasingly less expensive, that is to say an easy realization with a high manufacturing efficiency.

The present invention permits of solving these problems by means of a switching element of the kind defined in the opening paragraph, characterized in that the first guide $G_{ii}$, designated as main guide, is connected by one of its ends to the input of the switching element and by its other end to a direct output of the switching element, the second guide $H_{ii}$, designated as secondary guide, is provided in a region situated byond the zone of the electrodes $E_{ii}$ with a mirror $M_{ii}$ constituted by a flat lateral surface formed at 45° with respect to the optical axis of said guide, the secondary guide $H_{ii}$ is connected to a guide portion, designated as secondary guide $H'_{ii}$, arranged at 90° with respect to the optical axis of $H_{ii}$ in order to receive the light reflected by the mirror $M_{ii}$, the secondary guide $H'_{ii}$ is coupled through a distance d to a transverse main guide $G'_{ii}$ parallel to $H_{ii}$ crossing the main guide $G_{ii}$ and connected by its end opposite to $G_{ii}$ to a transverse output of the switching element, the secondary guide $H'_{ii}$ and the transverse main guide $G'_{ii}$ are provided with electrode systems $E'_{ii}$ for the application of potentials or currents permitting the switching of the light from one of these guides to the other, the guides and the substrate are covered by a planar layer of semiconductor material having a third refractive index $n_2$ lower than that of the guides, on whose flat upper surface the electrode systems $E_{ii}$ and $E'_{ii}$ are arranged and which has an opening $Q_{ii}$ exposing the structures of the guides as far as the substrate around the mirror $M_{ii}$.

BRIEF DESCRIPTION OF THE DRAWINGS

The invention will be understood more clearly by means of the following description illustrated by the accompanying Figures, of which.

Figure 3A:
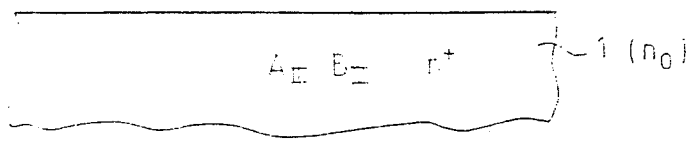
Figure 5A:
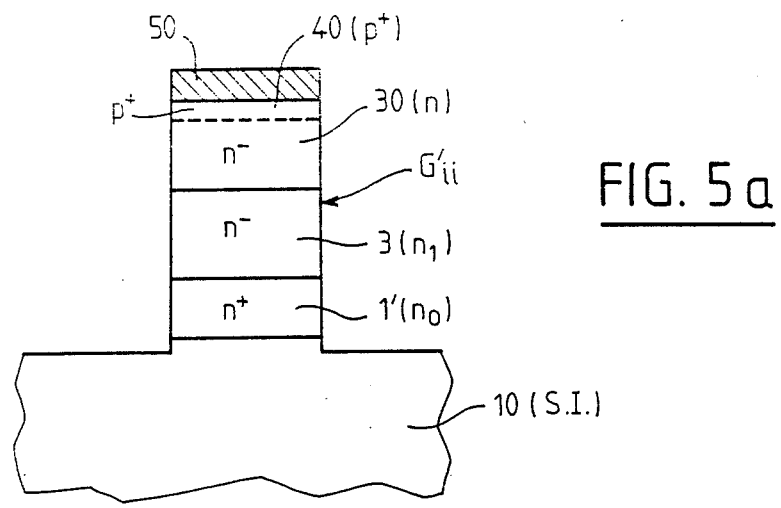
Figure 5B:
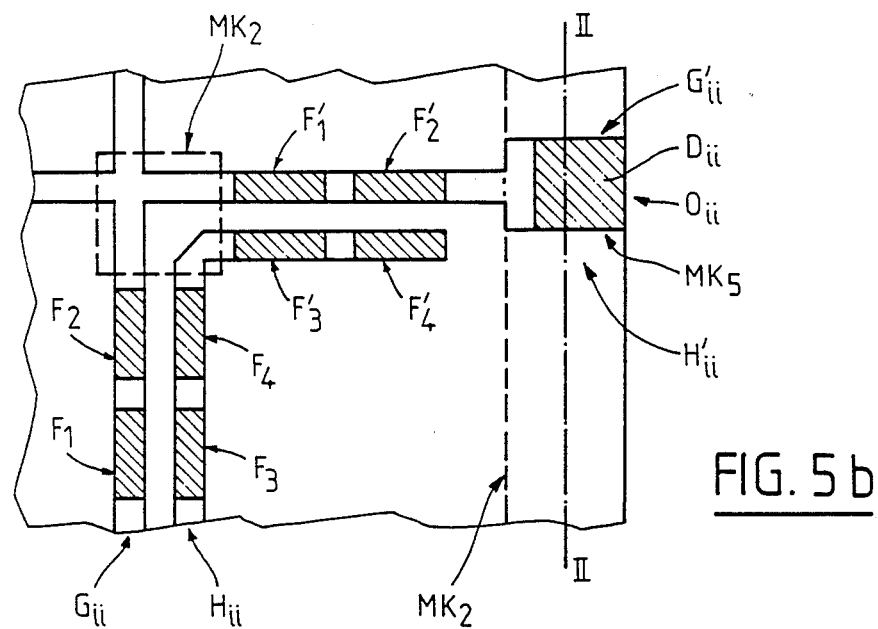
Figure 6A:
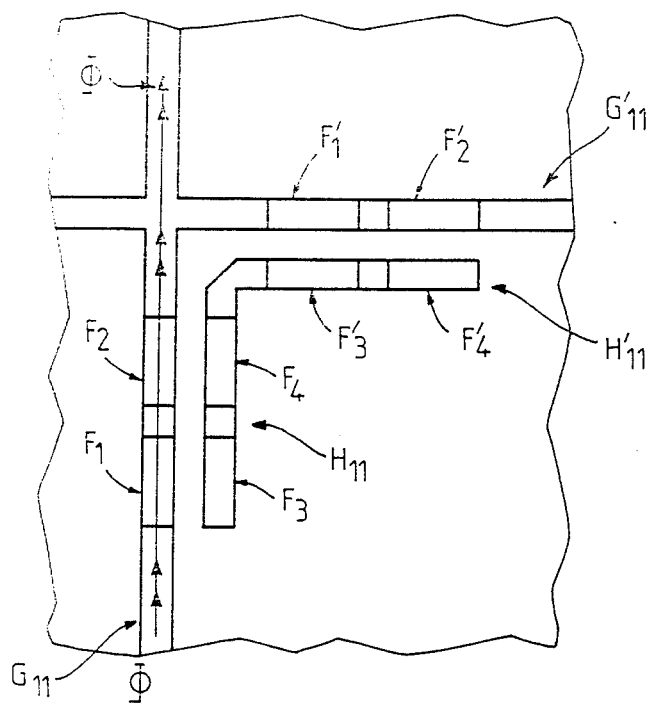
Figure 6B:
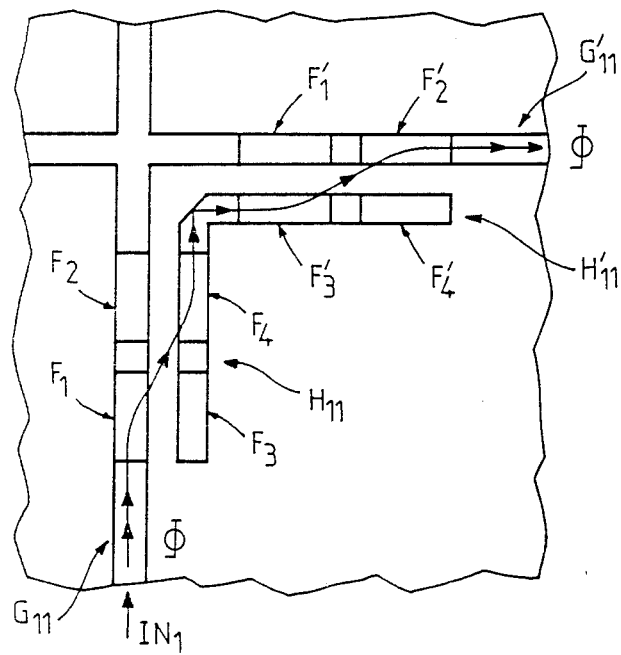

the whole of FIGS. 3a and 3l illustrates a method of manufacturing a switching element according to the invention;

the whole of FIGS. 4a to 4f illustrates a method of manufacturing a variation of the switching element according to the invention;

the whole of FIGS. 5a and 5b illustrates a method of manufacturing photodetectors applied to the outputs of the guides of the switching matrix according to the invention;

FIGS. 6a and 6b show the path of the beams in a switching element according to the invention.

DESCRIPTION OF THE PREFERRED EMBODIMENT

Figure 1:
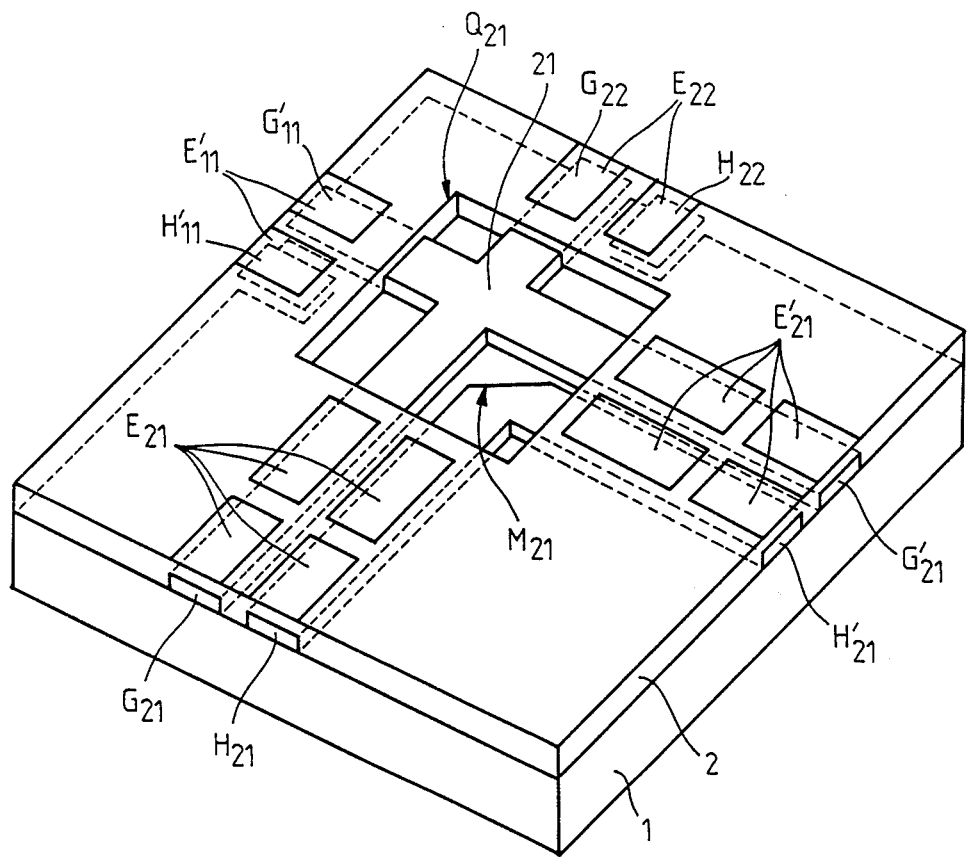
FIG. 1 shows diagrammatically the switching element according to the invention in perspective view.

As shown in FIG. 1, the switching element according to the invention comprises, formed on an orientated monocrystalline substrate 1 having a small refractive index $n_o$, two semiconductor strips $G_{21}$ and $H_{21}$ having a higher refractive index $n_1 > n_o$.

These strips in FIG. 1 have a rectangular cross-section. They are linear and are mutually separated by a distance d, designated as coupling distance. They are parallel over a distance D to their optical axis, designated as coupling length.

These strips are embedded in a layer 2 having a small refractive index $n_2 > n_1$ permitting of obtaining a planar structure.

The guide $G_{21}$ is prolonged over the whole dimension of the element shown in FIG. 1 and merges into the guide $G_{22}$. It crosses at a straight angle at the point 21 a guide $G'_{21}$ having a structure identical to that of the guides $G_{21}$ and $H_{21}$.

On the contrary, the guide $H_{21}$ is provided with a mirror $M_{21}$, whose surface is perpendicular to the plane of the substrate 1 and arranged at 45° with respect to the optical axis of this guide $H_{21}$. This mirror reflects the wave originating from the guide $H_{21}$ to a guide $H'_{21}$ of the same structure and perpendicular to the latter.

The guides $H'_{21}$ and $G'_{21}$ are arranged parallel to each other and separated from each other by the coupling distance d and over a length D defined above.

The planarization layer 2 has a window $Q_{21}$ exposing the zone 21 of intersection of the guides $G_{21}$, $G'_{21}$ and the region of the mirror $M_{21}$ applied to the guide $H_{21}$.

The dimensions of the window $Q_{21}$ are small with respect to the coupling length D, which does not appear from FIG. 1, which is a diagrammatic representation of the structure according to the invention and is not a representation on a given scale.

The switching element according to the invention further comprises a first system of four electrodes, whose positions over the guides $G_{21}$ and $H_{21}$ are designated by $E_{21}$. This system is constituted by two surfaces arranged over the guide $G_{21}$ parallel to its axis, which surfaces are mutually separated by a small distance in order to avoid shortcircuits, and by two identical surfaces arranged over the guide $H_{21}$. These electrodes are formed at the surface of the planar layer 2 and a method of manufacturing them will be described in detail hereinafter.

It should be noted that the operation of these electrodes can be obtained by the application of potentials or currents. Thus, the signal can be modulated either by the generation of an electric field resulting in an electro-optical effect or in a depletion of carriers or by the injection of carriers.

The switching element according to the invention finally comprises a second system of four electrodes identical to the first system formed over the guides $G'_{21}$ and $H'_{21}$, whose position is designated by $E'_{21}$.

Figure 2:
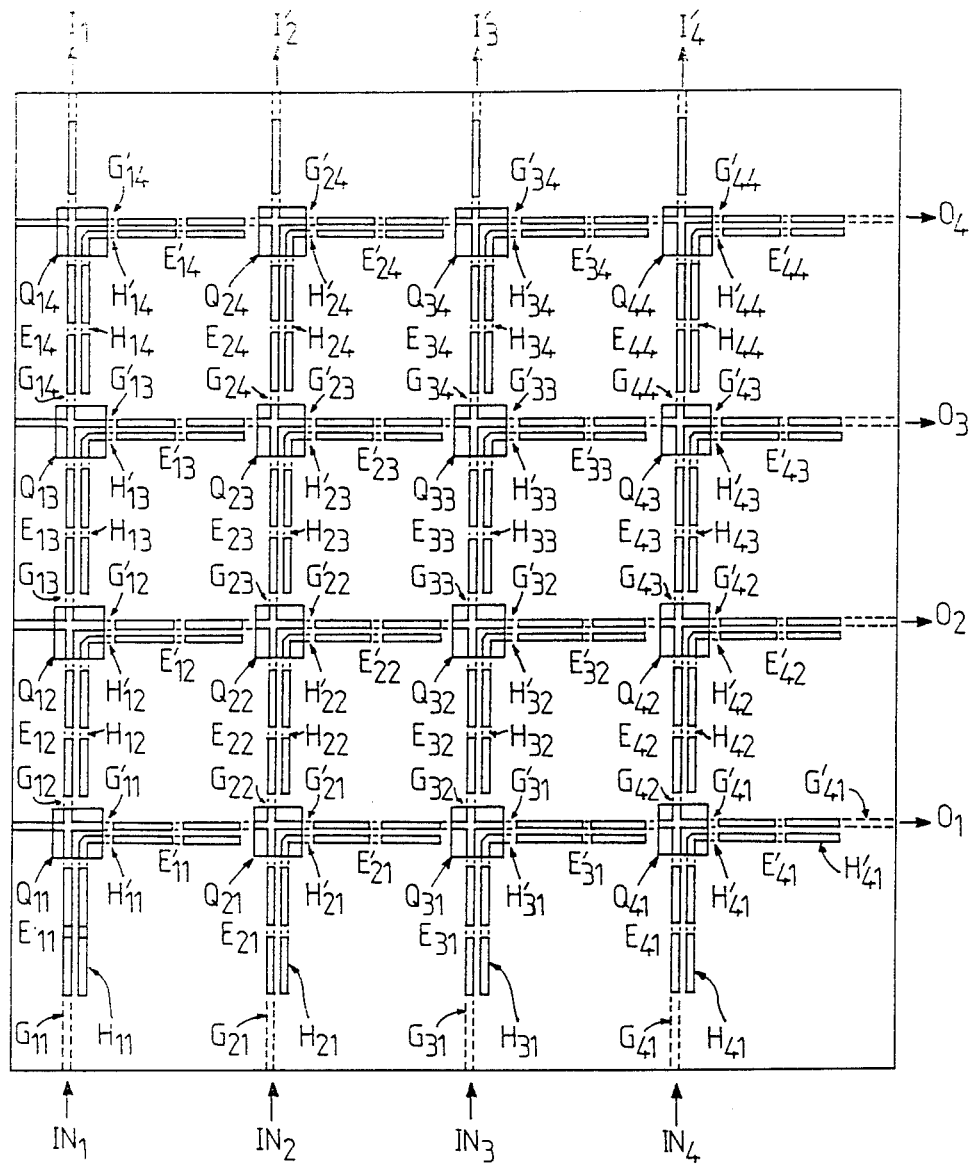
FIG. 2 shows diagrammatically in plane view a switching matrix constituted by 4×4 switching elements according to the invention.

A switching matrix constituted by 4×4 of these elements is shown diagrammatically in plan view in FIG. 2. This matrix is obtained by arranging in cascade on a substrate 1 4×4 structures of the kind shown in FIG. 1.

This matrix can operate in the following manner: A luminous signal $\phi$, for example, is injected at the input $IN_1$ of the matrix into the guide $G_{11}$. By the action of a suitable potential or a suitable current applied to the system of electrodes $E_{11}$ the light beam can:

either be held in $G_{11}$ without passing into $H_{11}$ by spontaneous coupling due to the coupling distance d (cf. FIG. 6a);

or pass entirely into $H_{11}$ (cf. FIG. 6b).

In the latter case, the beam is reflected into the guide $H'_{11}$ by means of the mirror $M_{11}$ and a suitable potential or a suitable current is applied to the system of electrodes $E'_{11}$ to cause the beam to pass from the guide $H'_{11}$ into the guide $G'_{11}$. The guides $G_{ii}$ and $G'_{ii}$ are designated as "main guides". The main guide $G'_{11}$, which is prolonged by the guides $G'_{21}$ . . . $G'_{41}$, conducts the beam, which can be received at the output $O_1$ (cf. FIG. 2).

On the contrary, if the beam has been held in the main guide $G_{11}$, it can then be conducted either at the direct output $I'_1$ or at one of the transverse outputs $O_2 \ldots O_4$ by acting upon the potentials applied to the electrodes $E_{12}, \ldots E_{14}$.

A switching matrix can be constituted by $n \times n$ elements according to the invention. It then comprises n inputs $UN_1 \ldots IN_4 \ldots IN_n$ such that a luminous signal injected into one of them, for example $IN_i$, can be either switched to one of the outputs of the transverse main guides $O_1 \ldots O_4 \ldots O_n$ or be directed to the direct output of the main guides $I'_i$. Such a matrix can also comprise $1 \times n$ elements according to the invention, or $n \times m$ of said elements in accordance with the invisaged use.

The structure of the switching element according to the invention permits of utilizing a particularly advantageous manufacturing method.

Figure 3B:
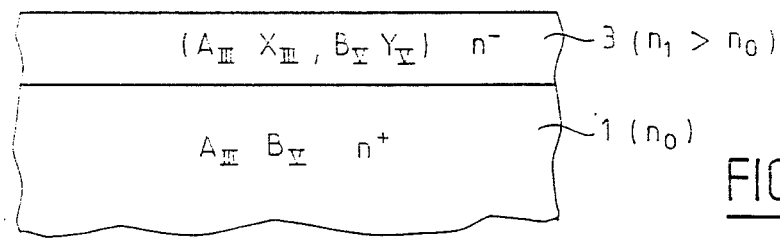
Figure 3C:
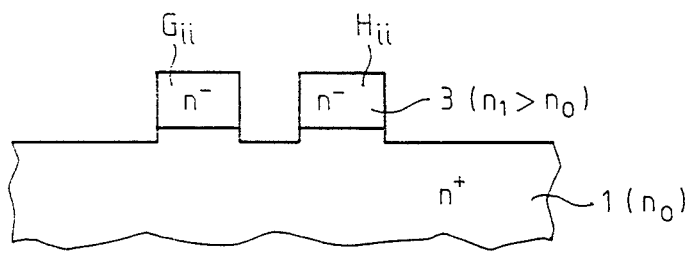
Figure 3D:
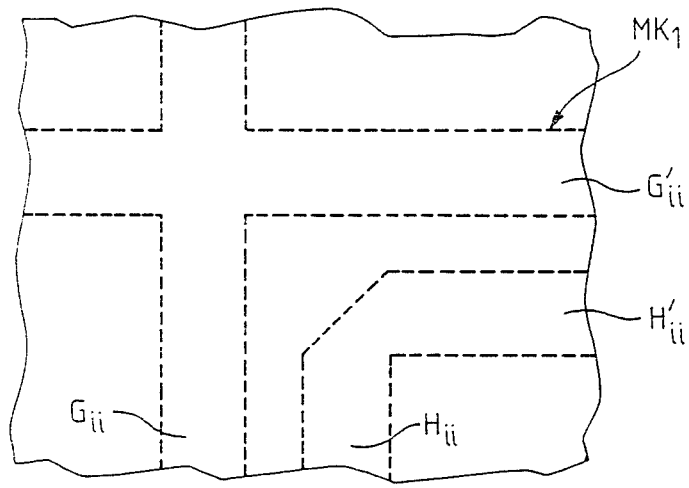

According to the invention, this method comprises at least the following steps illustrated in the different FIGS. 3:

a/ forming a monocrystalline substrate 1 having a flat surface orientated along a cyrstallographic plane, this substrate being made of a binary material $A_{III}B_V$ chosen so as to have a low refractive index $n_o$ for a given wave length $\lambda$ of utilization of the device and of a conductivity type n+ to permit the electric activation of the device (cf. FIG. 3a).

b/ forming for constituting the guides at the surface of the substrate 1 flat epitaxial layer of a material, for example a quaternary material ($A_{III}X_{III},B_VY_V$) chosen so as to present a refractive index $n_1 > n_o$ at the wave length $\lambda$ and of the conductivity type n− (cf. FIG. 3b).

c/ etching, for example by the reactive ion etching (RIE) method the quaternary layer 3 until an etching of the substrate 1 is obtained over a depth e″ not exceeding 0.5 μm, for example over a depth of 0.1 to 0.5 μm (cf. FIG. 3c). This etching is effected with the use of a mask $MK_1$ shows in plane view in FIG. 3d, which permits of maintaining after etching in relief on the substrate:

the strips which form direct main guides and transverse main guides $G_{ii}$ and $G'_{ii}$, respectively;

the strips forming the secondary guides $H_{ii}$ and $H'_{ii}$, and which permit of forming the mirrors $M_{ii}$.

The RIE method has the advantage that etching edges are obtained perpendicular to the plane of the surfaces to be etched (cf. FIG. 3c), which is important for the formation of the mirrors $M_{ii}$.

By the method according to the invention, the optical guides and the mirrors are formed in a single step and with a single mask by means of a so-called self-aligned technique.

Figure 3F:
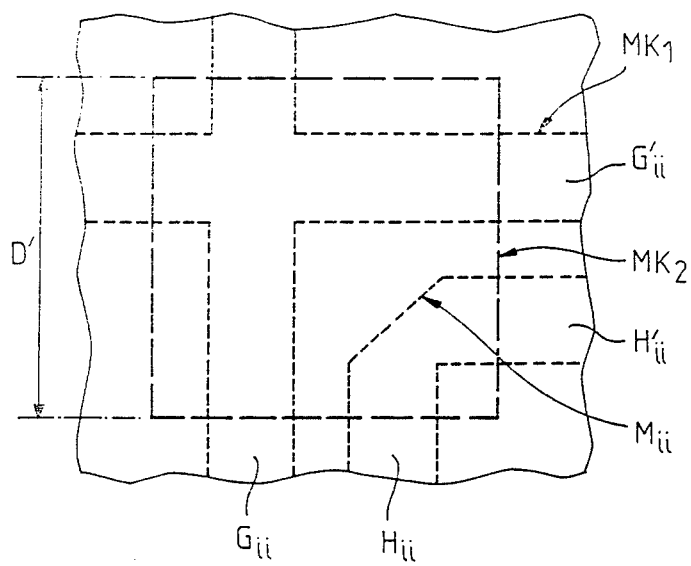
Figure 3E:
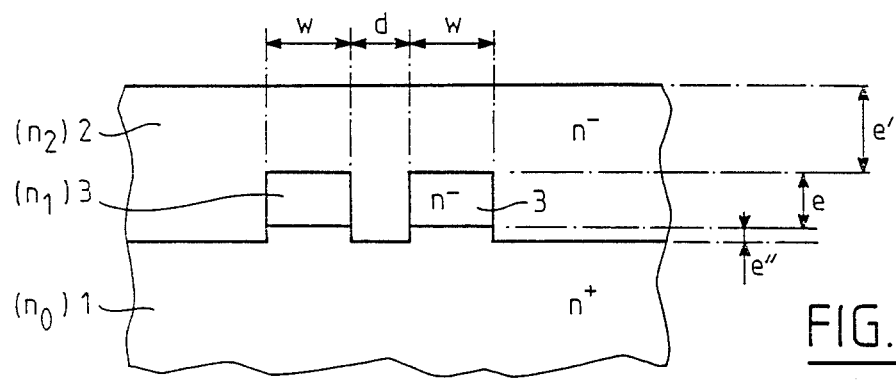

The relative indices of the substrate and of the guides are chosen so as to achieve that the light is confined in the guide. However, especially the composition of the quaternary and binary layers, respectively, permits of obtaining guidance.

d/ forming by epitaxial growth a layer 2 of a binary material ($A_{III}, B_V$) of small index $n_2$, such as $n_2 > n_1$, and of the conductivity type n− (cf. FIG. 3e).

This step serves to obtain a planar device. The epitaxial growth will therefore be carried out for this purpose either from the vapour phase or from the liquid phase, but in growth conditions such that at the surface of the guides the layer is planar. The thickness of the planarization layer 2 above the guides is e′.

It has appeared above that the device according to the publication by A. Carenco being of the "external strip" type has a small coupling coefficient and therefore required a great coupling length.

According to the invention, on the contrary, the guides are embedded in the planarization layer 2 having a slightly different index. In these conditions, the coupling coefficient is then about 4 times higher than the coupling coefficient obtained in the device known from the prior art. The coupling length D is therefore strongly reduced. The device according to the invention is miniaturized and its dimensions are suitable to form an integrated circuit.

Moreover, the materials $A_{III}B_V$ used and the epitaxial growth and reactive ion etching techniques utilized are in perfect synergism with the formation of integrated circuits adjacent to the electrooptical device according to the invention.

It is moreover important to note that during the eptiaxial growth of the planarization layer 2 approximately square regions $Q_{iii}$ corresponding to the regions of intersection of the main guides $G_{ii}$ and $G'_{ii}$ and to the regions of the mirrors $M_{ii}$ are masked by a mask $MK_2$ in order to be protected from the layer 2.

In fact, the mirrors $M_{ii}$ can only be totally reflecting if the medium external of the guides at the area of these mirrors is air, which is obtained by means of the openings $Q_{ii}$ of the layer 2 (FIG. 3e shows the guides in sectional view and FIG. 3f shows the mask $MK_2$ in plane view).

In an advantageous manner, the choice is made to form the guides in a thickness e≈1 μm and in a width w≈2 μm (cf. FIG. 3e), mutually separated by a distance d≈1.5 μm and to form the planarization layer 2 in a thickness e′ above the guides of about 1 μm.

It should be noted that the planarization layer 2 affords a further advantage, which consists in that the losses in the guides are reduced. In fact, due to the fact that the longitudinal and upper walls of the guides are obtained by etching, they can have a rough aspect, which, if air were the external medium, would lead to considerable losses by diffusion.

Due to the fact that the guides are buried in a medium having an index $n_2$ relatively close to that ($N_1$) of the guides, these losses are the smaller as the difference $n_1 - n_2$ is smaller. This effect differs from that of the confinement, which produces the guidance in the medium having the index $n_1$, according to which a small difference of indices $n_1 - n_2$ suffices to ensure this guidance. On the other hand, a small difference of indices is also necessary to ensure the monomode operation.

However, there will certainly be losses in the guides at the level of the openings $Q_{ii}$ in the layer 2. However, these openings are made in small dimensions, favourably $D' \times D' \approx 10$ μm × 10 μm at most, in order to limit these losses. On the other hand, in order to limit the losses, it can be ensured that the width w of the guides $H_{ii}$ and $H'_{ii}$ in the region of the openings $Q_{ii}$ is increased by receding parts 14 and 15, as shown, for example, in FIG. 4f. In fact, the wave A propagating in the buried guides has the form shown in FIG. 3j, while the wave A propagating in the guides above which air is present has the form shown in FIG. 3k. Therefore, the enlargement of the guides by the receding parts 14 and 15 permits of reducing the losses, as shown in sectional view in FIG. 3l.

Finally, the planarization layer 2 further has the advantage that it offers an upper surface particularly suitable for the formation of the electrodes over the guides.

Figure 3H:
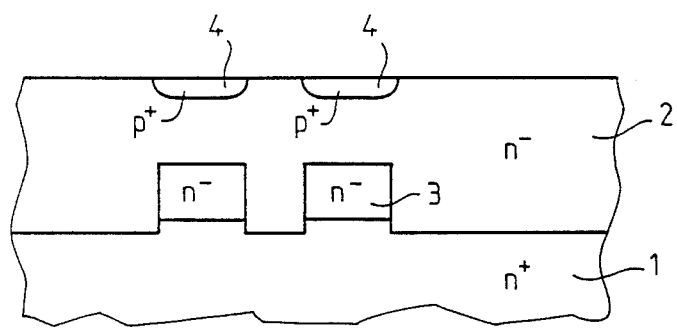
Figure 3G:
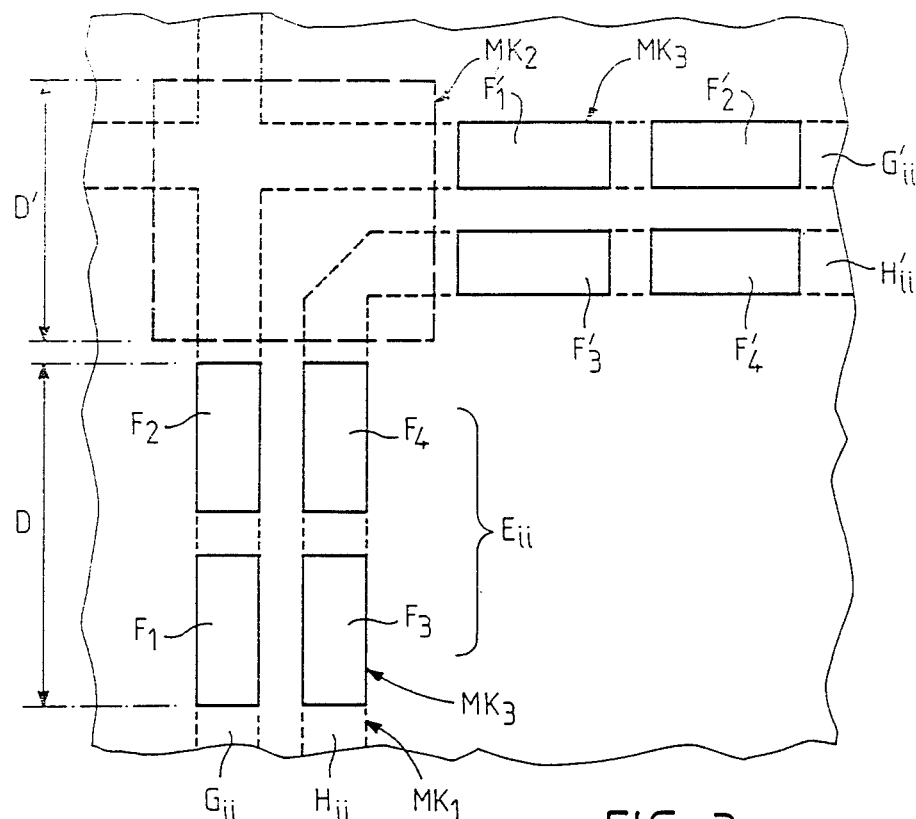
Figure 3I:
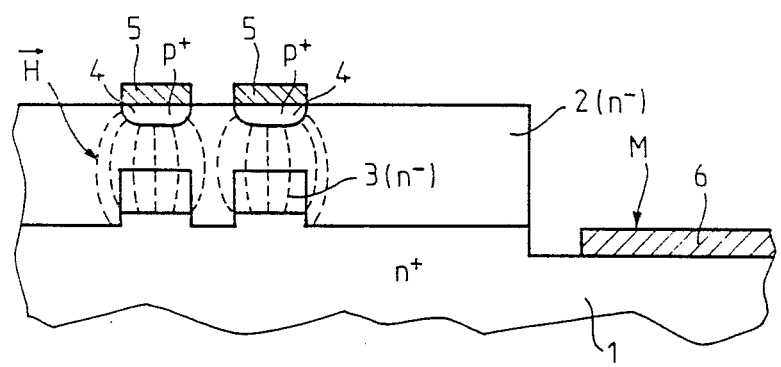

(e) forming for constituting the electrode system $E_{ii}$ and $E'_{ii}$ zones 4 of the conductivity type $P^+$ in the planarization layer 2 over the guides, for example by ion implantation (cf. FIG. 3h). Thus, 2 regions $F_1$ and $F_2$ will be formed over the guides $G_{ii}$ and 2 regions $F_3$ and $F_4$ will be formed over the guides $H_{ii}$. The ion implantation is effected in a single step through the openings of a mask $MK_3$, as shown, for example, in FIG. 3g. The regions of the $p^+$ type may also be formed by diffusion of ions. The coupling length D is only slightly smaller that 1 mm, while the dimension D' of the opening $Q_{ii}$ is of the order of 10 μm, as already stated above.

f) forming for continuing the formation of the electrode system $E_{ii}$ and $E'_{ii}$ metallic layers 5 at the surface of the zones (4) of the $p^+$ conductivity type by any means known from the prior art to obtain an ohmic contact, for example by means of a multi-layer of titanium-platinum-gold (Ti-Pt-Au) (cf. FIG. 3i).

The positioning of the mask $MK_3$ does not give rise to problems of definition for two reasons. The first reason is that the structure is planar. The photolithographic methods can therefore be readily carrried out. The second reason is that, although the guides are no longer visible by means of the positioning of the mask $MK_3$, the latter will be centered and the openings will be aligned whilst using the positions of the openings as their references. This affords a supplementary advantage due to the structure of the device according to the invention.

It should further be noted that the reactive ion etching process effected during the step c/ and effected as far as into the substrate resulting in a small hollowing-out of said substrate over a depth e" has advantages for the device according to the invention. First of all, it is easier to slightly etch the substrate than to stop the etching treatment really exactly at the level of the upper surface of the substrate. This procedure therefore constitutes a technological facility. However, moreover, this small hollowing of the substrate permits of increasing the interaction between the electric field and the optical field to maximize the electrooptical effect in the device according to the invention. The optical guides are thus more satisfactorily isolated, as shown in FIG. 3c in sectional view, in which the electric field lines H are represented.

In a variation of the device according to the invention, the substrate is no longer of the $n^+$ conductivity type. It is semi-isolating. This variation is advantageous in the case in which electronic integrated circuits, such as detectors, amplifiers etc. including diodes or field effect transistors, should be associated with the switching matrix and should be formed on the same substrate.

Figure 4A:
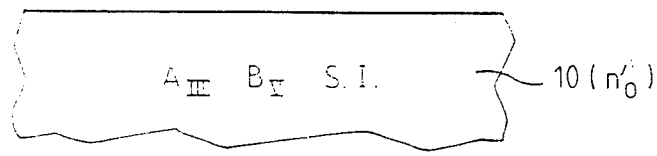
Figure 4B:
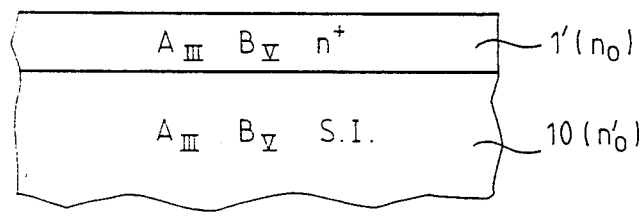
Figure 4C:
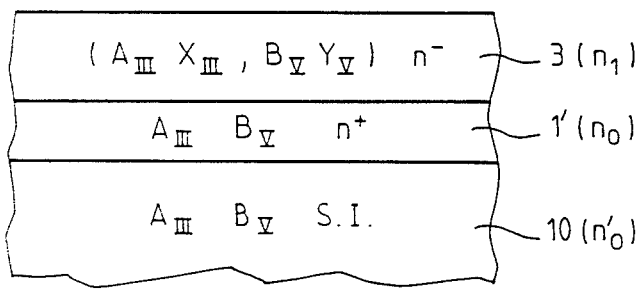
Figure 4D:
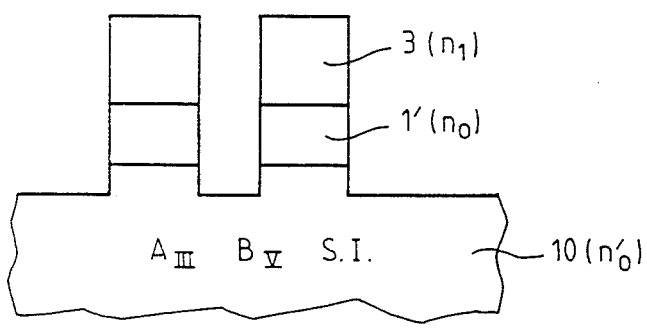
Figure 4E:
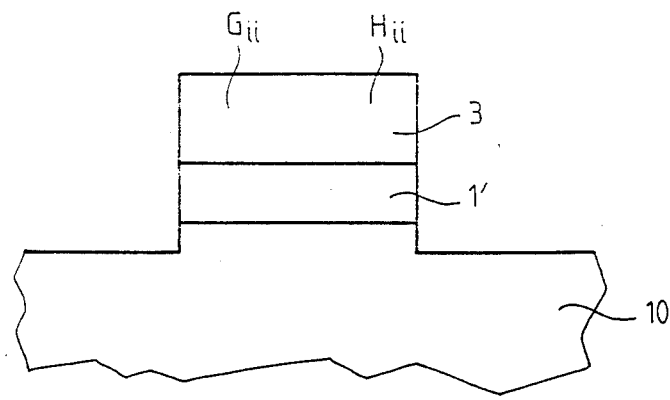
Figure 4F:
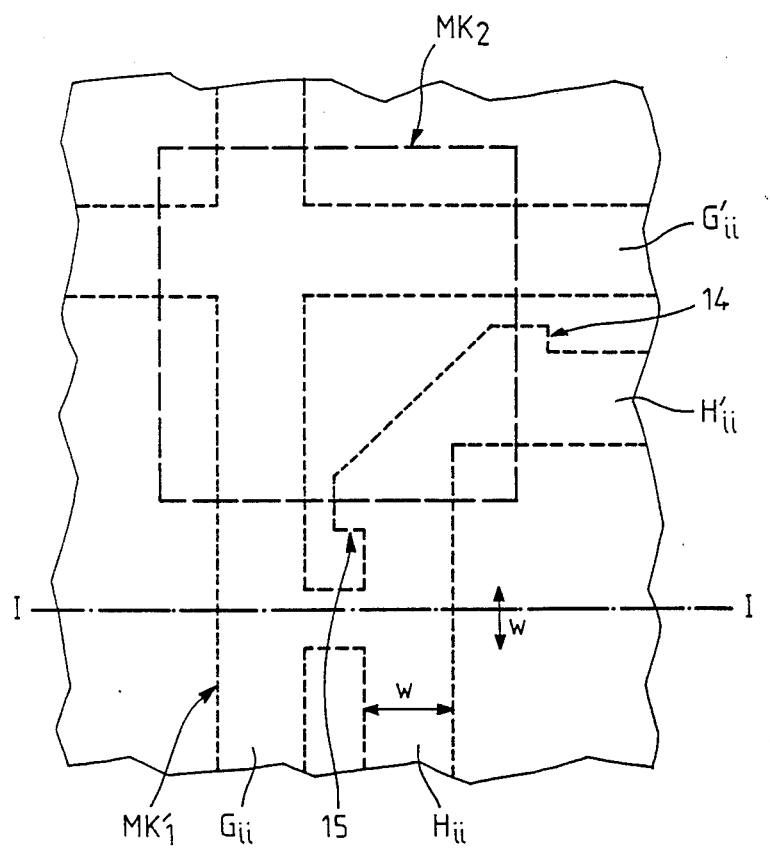

In this case, the steps a/, b/, c/ of the method of manufacturing described above are replaced by the sequence of steps illustrated in FIG. 4.

a'/ forming a monocrystalline substrate 10 having a flat surface orientated along a crystallographic plane and made of a binary material $A_{III}B_V$ chosen so as to have a small refractive index $n'_o$ for a wavelength λ and to be semi-isolating (cf. FIG. 4a).

b'/ forming at the surface of the substrate 10 a flat epitaxial layer 1' of the material $A_{III}B_V$ of the $n^+$ conductivity type. The thickness of this layer will favourably be 0.5 μm. The refractive index of this layer wil be chosen to be small $n'_o \approx n_o$ for the wavelength λ (cf. FIG. 4b).

b'$_2$/ forming at the surface of the layer 1' a flat epitaxial layer 3 having a thickness of about 0.5 to 1 μm of a material, which is, for example, ternary ($A_{III}X_{III}B_VY_V$) chosen so as to have a refractive index $n_1 > n_0$ or $n'_o$ at the wavelength λ and of the $n^-$ conductivity type (cf. FIG. 4c).

c'/ etching, for example by the reactive ion etching (RIE) method, layers 3 and 1' until the lower substrate 10 is attacked over a depth e" not exceeding 0.5 μm (cf. FIG. 4d). This etching step is carried out according to a mask $MK'_1$. The mask $MK'_1$ defines the optical guides, as shown in FIG. 3c, and is used for etching the layer 3 and a part of the subjacent layer 1', but it permits of maintaining parts of the layers 1' and 3 to form "bridges", that is to say connections through the layer 1' of the $n^+$ conductivity type, in order to electrically connect all the guides to each other. In fact, the mass contact(s) M will be established on this $n^+$ layer and if it should be avoided that too many mass contacts are formed, it is advantageous that the $n^+$ layer parts under the guides are simply connected to each other (cf. FIG. 4e in sectional view taken on the axis I—I of FIG. 4f, which is a representation of the device in plane view). The formation of the bridges for electrical connection between one guide and the other is not critical and these bridges can be positioned at any place in the device provided that none of the guides or guide portions is isolated. On the other hand, it is known that the presence of these bridges does not disturb the propagation of the wave in the guides provided that they have small transversal dimensions, for example equivalent to the width w of a guide. One or the other of these methods of manufacturing leading to one or the other of the variations of the device according to the invention is continued by the following steps:

g/ forming electrodes M of mass contacts 6 at the surface of the layer 1 or 1' of the $n^+$ conductivity type (cf. FIG. 3i). For this purpose, it is ensured that at areas at which no devices are present the upper layers are etched until a part of the layer 1,1' is exposed and that a metallic layer of the ohmic contact type, for example a multi-layer of gold-germanium nickel (Au-Ge-Ni) is deposited there. In dependence upon the applications, these electrodes of mass contacts may be formed on one or the other of the surfaces of the device. In fact, if the substrate is of the $n^+$ type, the mass contact may be formed either on the back surface of the device or on the front surface by etching the upper layers. If the substrate is semi-isolating, the mass contact will be formed on the front surface by etching the layers 2 and 3.

The use of the device according to the invention lies inter alia in the field of telecommunication. For this purpose, the wavelengths of the luminous signal transported by the guides can be:

$\mu_0 \approx 1.3$ μm or $\lambda_1 \approx 1.55$ μm.

In these conditions, in the formulation of the binary compound $A_{III}B_V$ constituting the substrate, $A_{III}$ may advantageously be the element indium (In) and $B_V$ the element phosphorus (P) forming indium phosphide (InP).

This substrate can be made semi-isolating by a doping by means of the element iron (Fe) introduced at a concentration of: $10^{16}$ cm$^{-3}$.

The compound InP may also be of the n+ conductivity type if it is doped by means of the S atom at a concentration of the order of $2.10^{18}$ impurities per cm$^3$.

The index is then $n_o \simeq 3.1994$ at $\lambda \simeq 1.32$ μm.

The quaternary compound forming the layer 3, which is suitable to constitute the guides, can have the formulation $A_{III}X_{III}, B_VY_V$, where A is indium (In), X is gallium (Ga), B is phosphorus (P) and Y is arsenic (As). Its composition is then $(Ga_xIn_{1-x}As_yP_{1-y})$, in which the concentration is $y \simeq 0.1$ and the concentration $x \simeq 0.46$ $y \simeq 0.046$. This compound has the index $n_1 > n_o$, such as $n_1 \simeq 3.2049$ at $\lambda \simeq 1.32$ μm. The gap wavelength of the GaInAsP is 0.97 μm.

This quaternary compound (GaInAsP) can have an n− conductivity type if it is simply freed from intentional doping.

The planarization layer 2 can be made, as has been stated above, of a binary compound $A_{III}B_V$ of the n− conductivity type, that is to say, for example, of indium phosphide (InP) not doped intentionally and having the index:

$n_2 \simeq 3.2049$ at $\lambda$ 1.32 μm.

In a variation of the invention, the planarization layer 2 may also be made of a quaternary compound $(A_{III}X_{III},B_VY_V)$, such as $(Ga_xIn_{1-x}As_yP_{1-y})$ of the n− conductivity type, that is to say not doped intentionally, in which the concentration x is equivalent to 0.46 y with $y \simeq 0.03$ to 0.05.

The islands of the p+ conductivity type can be obtained by implanting or diffusing ions by means of well known techniques, for example of Zn or Be or Cd, at a concentration of $10^{18}$ to $10^{19}$ cm$^{-3}$.

When realized in this manner, a matrix of 4×4 switching elements would have the dimensions: 4×4 mm$^2$, the dimension of one element being of the order of 1×1 mm$^2$, mainly imposed by the coupling length D.

As stated above, the technology of forming the matrix according to the invention is in synergism with the formation of integrated circuits, such as detectors D.

These detectors may be, for example, diodes $D_{ii}$ formed at the surface of the main output guide $I'_{ii}$ or $O_{ii}$ (cf. FIG. 5b, which is a plane view of such a device, and FIG. 5a, which is a sectional view taken on the axis II—II). In the region of the detectors $D_{ii}$, it is to be noted that the width w of the guides $H'_{ii}$ is increased.

In the embodiments mentioned above, in which the substrate is made of a binary semiconductor material $A_{III}B_V$, such as InP, these diodes may comprise an absorbing layer 30 formed at the surface of the layer 3 of the guides. This absorbing layer is favourably a layer of a ternary material $(A_{III}X_{III}Y_V)$, such as GaInAs of the n− conductivity type having a thickness of about 1 μm. This absorbing layer 30 will be formed in the opening of a mask MK$_5$, which covers the assembly of the device except the outputs of the main direct and transverse guides. The said layer is obtained, for example, by epitaxial growth from the vapour or the liquid phase.

Subsequently, the mask MK$_5$ is eliminated in order to permit of realizing the step (c).

The step (c) of etching layers, in this case 30, 3 and 1', is effected in the manner already described. Between the step (c) and the step (d) a step is then interposed, in which a dielectric protective layer is deposited on the detection zone, which dielectric layer may be MK$_2$, in order to protect the detection zone from the deposition of the planarization layer 2. This protective layer MK$_2$ is maintained till the end of the step (d) of planarization, whereupon it is withdrawn. The mask MK$_3$, which defines the zones of p+ implantation, will then be provided with openings at the surface of the detection zones and the steps (e) and (f) will be continued in the manner stated above. In these conditions, a region 40 of the p+ conductivity type will be formed in each detection zone 30 followed by the formation of an electrode contact 50 (cf. FIG. 5a).

Other materials may be considered for carrying out the invention and may be used in other dimensions. In these conditions, the transported wave will have a different wavelength and the envisaged applications may be other than telecommunication.

The method of manufacturing may also be used with other etching or deposition techniques.

What is claimed is:

1. An optical switching element comprising two optical guides, whose opposite walls are separated by a small distance d, designated as coupling distance, and are parallel over a length D, designated as coupling length, these optical guides being each constituted by a linear strip $G_{ii}$ and $H_{ii}$, respectively, of a semiconductor material having a first refractive index $n_1$ formed on a semiconductor substrate of a material having a second smaller refractive index $n_o$, the dimensions of these guides being such that they each transport a monomode wave and the operation of switching the light from one guide to the other guide being controlled by the effect of at least one of potentials and currents, to which electrode system $E_{ii}$ and M applying to the guides are brought, characterized in that the first guide $G_{ii}$ designated as main guide is connected by means of one of its ends to the input of the switching element and by its other end to a direct output of the switching element and by its other end to a direct output of the switching element, the second guide $H_{ii}$ designated as a secondary guide is provided in a region situated beyond the zone of the electrodes $E_{ii}$ with a mirror $M_{ii}$ constituted by a flat lateral surface formed at 45° with respect to the optical axis of said guide, the secondary guide $H'_{ii}$ is connected to a guide portion designated as secondary guide $H_{ii}$, arranged at 90° with respect to the optical axis of $H_{ii}$ in order to receive the light reflected by the mirror $M_{ii}$, the secondary guide $H'_{ii}$ is coupled through a coupling distance d to a transverse main guide $G'_{ii}$ parallel to $H_{ii}$ crossing the main guide $G_{ii}$ and connected by its end opposite to $G_{ii}$ to a transverse output of the switching element, the secondary guide $H'_{ii}$ and the transverse main guide $G'_{ii}$ are provided with electrode systems $E'_{ii}$ for the application of at least one of potentials and currents permitting the switching of the light from one of these guides to the other, the guides and the substrate are covered by a planar layer (2) of semiconductor material having a third refractive index $n_2$ lower than that of the guides, on whose flat upper surface the electrode systems $E_{ii}$ and $E'_{ii}$ are arranged and which has an opening $Q_{ii}$ exposing the structures of the guides as far as required to expose the substrate around the mirror $M_{ii}$.

2. An element as claimed in claim 1, characterized in that the cross-section of the guides is rectangular.

3. An element as claimed in claim 2, characterized in that the substrate (10) consists of a binary ($A_{III}, B_V$) semi-isolating material, in that the strips forming the guides are constituted by the superposition of a layer (1') of the binary material ($A_{III}, B_V$) of the n+ conductivity type and a layer (3) of a quaternary material ($A_{III}X_{III}B_V Y_V$) of the n− conductivity type, in that the planar layer (2) consists of a material chosen among a binary material ($A_{III}, B_V$) and a quaternary material ($A_{III}X_{III}, B_V Y_V$) of the n− conductivity type, and in that the portions of the layer (1') of the n+ type that form the lower layers of the guides are electrically connected to each other.

4. An element as claimed in claim 2, characterized in that the substrate (1) is made of a binary material $A_{III}B_V$ of the n+ conductivity type, in that the strips (3) forming the guides consists of a quaternary material ($A_{III}X_{III}, B_V Y_V$) of the n− conductivity type, in that the planar layer (2) consists of a material chose among a binary material ($A_{III}, B_V$) and a quaternary material ($A_{III}X_{III}B_V Y_V$) of the n− conductivity type where A, X, B and Y represent elements of the periodic tables in the groups designated by their subscripts.

5. Element as claimed in claim 4, characterized in that the electrode system is constituted by firstly an electrode M(6) of the ohmic type connected to mass and formed by a metallic layer realized in contact with the material of the n+ conductivity type (1 or 1') and by secondly systems $E_{ii}$ and $E'_{ii}$ of four electrodes F1, F2, F3, F4 and $F'_1$, $F'_2$, $F'_3$, $F'_4$, respectively, grouped symmetrically such that two electrodes $F_1$, $F_2$ or $F'_1$, $F'_2$ are aligned with each other on the main guide and two electrodes $F_3$, $F_4$ or $F'_3$, $F'_4$ are aligned with each other opposite to each other on the secondary guide, each formed by the superimposition of an island (4) of the p+ conductivity type over the guides formed in the planar layer (2) and a metallic layer (5) forming an ohmic forming an ohmic contact on said planar layer (2).

6. An element as claimed in claim 4, characterized in that the element A is indium (In), the element B is phosphorus (P), the element X is gallium (Ga) and the element Y is arsenic (As).

7. An element as claimed in claim 4, characterized in that the ohmic contacts on the layer (1,1') of the n+ type are formed by a multi-layer of Au-Ge-Ni, and in that the ohmic contacts (5) on the layer (4) of the p+ type are formed by a multi-layer of Ti-Pt-Au.

8. An optical switching matrix comprising a number n of inputs $IN_1$, $IN_2 \ldots IN_n$, a number n of direct outputs $I'_1$, $I'_2 \ldots I'_n$ and a number m of transverse outputs $O_1$, $O_2, \ldots O_m$, between which the switching operation is effected, characterized in that it is formed by $n \times m$ switching elements as claimed in any one of claims 1 to 7 juxtaposed bidirectionally so that the main guides and the secondary guides of each element are extended parts, respectively, of each other.

9. A matrix as claimed in claim 8, characterized in that each main direct and transverse output guide is directly provided at its upper surface with a detector D of a light signal constituted by an absorbing layer (30) for the wavelength $\lambda$ of a refractive index $n_3$ larger than that of the guides, the absorbing layer (30) having formed in it an island (40) of the p+ type, at whose surface an ohmic contact (50) is formed.

10. A matrix as claimed in claim 9, characterized in that the absorbing layer (30) consists of a material ($A_{III}X_{III}B_V$).

11. A matrix as claimed in claim 9, characterized in that the ohmic contacts (50) of the detectors are constituted by the multi-layers Ti-Pt-Au.

12. A method of manufacturing a switching element as claimed in claim 1 comprising at least the steps of:
 a/ forming a monocrystalline substrate (1) having a flat surface oriented along a crystallographic plane, this substrate being formed from a binary material $A_{III}B_V$ having a small refractive index $n_o$ for a given operating wavelength $\lambda$, of the device and of the n+ conductivity type,
 b/ forming at the surface of the substrate (1) a flat epitaxial layer (3) of a quaternary material $A_{III}X_{III}B_V Y_V$ having refractive index $n_1 > n_o$ at the wavelength $\lambda$ and of n− conductivity type,
 c/ etching by the reactive ion etching (RIE) method the quaternary layer (3) until an etching of the substrate (1) is obtained over a small depth, this etching being effected by means of a mask ($MK_1$), which permits of maintaining after this etching step in relief on the substrate:
 the strips forming the direct and transverse main guides $G_{ii}$ and $G'_{ii}$ respectively,
 the strips forming the secondary guides $H_{ii}$ and $H'_{ii}$ permitting the forming of the mirrors $M_{ii}$ at 45° with respect to the axis of the guides $H_{ii}$ and $H'_{ii}$, perpendicular to the plane of the substrate.

13. A manufacturing method as claimed in claim 12, characterized in that it moreover comprises the steps of:
 (d) forming by epitaxial growth a layer (2) of a binary material $A_{III}B_V$ having a small index $n_2$, such that $n_2 < n_1$ and of the n− conductivity type, the region of the mirrors $M_{ii}$ and the detection regions (30), when they exist, being masked during this epitaxial growth by a mask ($MK_2$),
 (e) forming respective zones (40 and 4) of the p+ conductivity type on the one hand at the surface of absorbing regions (30), when they exist, and on the other hand in the planarization layer (2) over the guides to form two regions ($F_1$ and $F_2$) over the guides $G_{ii}$ and two regions ($F_3$ and $F_4$) over the guides $H_{ii}$ as well as two regions ($F'_1$ and $F'_2$) over the guides $G'_{ii}$ andt two regions ($F'_3$ and $F'_4$) over the guides $H'_{ii}$ by a method chosen among ion implantation and diffusion of ions through the openings of a mask ($MK_3$),
 (f) forming metallic contacts (5 and 50 respectively) at the surface of the zones (4 and 40) of the p+ conductivity type to form ohmic contacts,
 (g) forming metallic layers (6) at the surface of the layer (1) or (1') to form mass contacts (M).

14. A method of manufacturing a switching element as claimed in claim 1, comprising the steps of:
 (a') forming a monocrystalline substrate (10) having a flat surface orientated along a crystallographic surface made of a binary material $A_{III}B_V$ chosen so as to have a small refractive index $n'_o$ for a wavelength $\lambda$ and being semi-isolating,
 (b'₁) forming at the surface of the substrate (10) a flat epitaxial layer (1') of the material $A_{III}B_V$ of the n+ conductivity type and having a relatively small refractive index $n_o \simeq n'_o$ for the wavelength $\lambda$, (b'$_2$) forming at the surface of the n+ layer (1') a flat epitaxial layer (3) having a refractive index $n_1 > n_o$ or $n'_o$ at the wavelength $\lambda$ of the n− conductivity type, (c') etching, for example by the reactive ion etching (RIE) method the layers (3) and (1') until the lower substrate (10) is attacked over a small depth, this etching step being effected by means of a mask (MK'$_1$) defining the optical guides and the mirrors $M_{ii}$ at 45° with respect to the optical axis of the guides and perpendicular to the plane of the substrate and permitting portions of the layer (1') to form connections in this layer of the n+ conductivity type between the different parts of the guides.

15. A method as claimed in claim 14, characterized in that between the steps (b'$_2$) and (c') is included a step $c_o$ of:

(c$_o$) forming a mask (MK$_5$) covering the assembly of the device except the output ends of the guides $G_{ii}$ and/or $G'_{ii}$, forming at the surface of the end of these guides an absorbing layer (30) for the operating wavelength and then eliminating the mask (MK$_5$).

16. An optical switching element comprising two optical guides, whose opposite walls are separated by a small distance d, designated as a coupling distance, and are parallel over a length D, designated as a coupling length, these optical guides being each constituted by a linear strip of a semiconductor material having a first refractive index $n_1$ formed on a semiconductor substrate of a material having a second smaller refractive index $n_o$, the dimensions of said optical guides being such that they each transport a monomode wave and the operation of switching the light from one guide to the other guide being caused by electrical means connected to electrode systems acting on the guides, wherein the improvement comprises:

a main guide extending longitudinally from an input to an output;

a transverse main guide joining said main guide and extending transversely therefrom to a transverse output;

a secondary guide having two parts, said first part of said secondary guide extending parallel to and spaced apart from said main guide, said second part of said secondary guide extending parallel to and spaced apart from said transverse main guide, said first and second parts of said secondary guide being joined by reflecting means to reflect the light from said first part to said second part of said secondary guide;

first electrode means being disposed above said main guide and said first part of said secondary guide, second electrode means being disposed above said transverse main guide and said second part of said secondary guide;

the guides and substrate being covered by a planar layer of semiconductor material having a third refractive index $n_2$ lower than that of said guides, said first and second electrodes being disposed on the upper surface of said planar layer, an aperture being disposed in said planar layer, said aperture exposing the connection between said transverse main guide and said main guide and said reflecting means of said secondary guide;

upon electrical activation of said first electrodes, light energy entering said main guide being transferred to the first part of said secondary guide and being reflected by said reflecting means to said second part of said secondary guide; and upon electrical activation of said second electrode said light energy being transferred from said second part of said secondary guide to said transverse portion of said main guide to thereby exit said transverse output.

17. The optical switching element as claimed in claim 16 further including a plurality of optical switching elements disposed in a rectangular matrix.

18. The optical switch as claimed in claim 16 wherein said substrate comprise a III-V binary material of the n+ conducting type, said guides comprise a quaternary III-V material of the n− conductivity type and the planar layer comprises III-V material of the n− conductivity type.

* * * * *